(12) United States Patent
Woelfing et al.

(10) Patent No.: US 9,157,604 B2
(45) Date of Patent: Oct. 13, 2015

(54) LASER-BASED WHITE LIGHT SOURCE

(75) Inventors: Bernd Woelfing, Mainz (DE); Andreas Hatzenbuehler, Siefersheim (DE); Juergen Meinl, Hohenstein-Holzhausen (DE)

(73) Assignee: SCHOTT AG, Mainz (DE)

( * ) Notice: Subject to any disclaimer, the term of this patent is extended or adjusted under 35 U.S.C. 154(b) by 167 days.

(21) Appl. No.: 13/816,244

(22) PCT Filed: Aug. 11, 2011

(86) PCT No.: PCT/EP2011/004027
§ 371 (c)(1),
(2), (4) Date: Mar. 20, 2013

(87) PCT Pub. No.: WO2012/019767
PCT Pub. Date: Feb. 16, 2012

(65) Prior Publication Data
US 2013/0308332 A1 Nov. 21, 2013

(30) Foreign Application Priority Data
Aug. 11, 2010 (DE) .................. 10 2010 034 054

(51) Int. Cl.
*G02B 27/20* (2006.01)
*F21V 9/00* (2015.01)
*F21K 99/00* (2010.01)
*F21V 29/02* (2006.01)
*G03B 21/20* (2006.01)
*F21V 13/02* (2006.01)
*F21V 13/08* (2006.01)
*F21Y 101/02* (2006.01)

(52) U.S. Cl.
CPC ... *F21V 9/00* (2013.01); *F21K 9/56* (2013.01); *F21V 13/02* (2013.01); *F21V 13/08* (2013.01); *F21V 29/02* (2013.01); *G03B 21/204* (2013.01); *F21Y 2101/02* (2013.01)

(58) Field of Classification Search
CPC ....................................................... G02B 27/48
USPC .................................................. 362/553, 555
See application file for complete search history.

(56) References Cited

U.S. PATENT DOCUMENTS 7,442,356 B2 10/2008 Matsubara et al.
2001/0005388 A1 6/2001 Hirata et al.
(Continued)

FOREIGN PATENT DOCUMENTS

EP 1 763 116 A1 3/2007
JP 2009 259854 A 11/2009
JP 2010085740 4/2010

OTHER PUBLICATIONS

English machine translation of Iwanaga JP 2010085740.*
English translation of the International Search Report in corresponding international application No. PCT/EP2011/004027 dated Mar. 19, 2012.
(Continued)

*Primary Examiner* — Evan Dzierzynski
(74) *Attorney, Agent, or Firm* — Ohlandt, Greeley, Ruggiero & Perle, LLP

(57) ABSTRACT

A device for generating white light is provided that includes at least one light source and at least one conversion medium. The light source emits light in the blue and/or ultraviolet spectral range. The light from the light source is generated by a laser and the light from the light source is focused by an optical system onto the conversion medium. The conversion medium converts at least part of the incident light into a different spectral range.

18 Claims, 7 Drawing Sheets

(56) References Cited

U.S. PATENT DOCUMENTS

| | | | |
|---|---|---|---|
| 2004/0001618 A1* | 1/2004 | Johnson et al. | 382/131 |
| 2007/0047600 A1 | 3/2007 | Luo et al. | |
| 2007/0221925 A1* | 9/2007 | Aliyev et al. | 257/79 |
| 2009/0034284 A1* | 2/2009 | Li et al. | 362/554 |
| 2009/0237955 A1* | 9/2009 | Mukai | 362/553 |
| 2009/0262308 A1 | 10/2009 | Ogawa | |
| 2009/0284148 A1 | 11/2009 | Iwanaga | |
| 2010/0033970 A1* | 2/2010 | Jetter et al. | 362/268 |

OTHER PUBLICATIONS

Venugopal Rao et al.: "Nonlinear frequency conversion in semiconductor optical waveguides using birefringent, modal and quasi-phase-matching techniques", J.Opt.A: Pure Opt. vol. 6, No. 6, pp. 569-584 (2004).

English translation of the International Preliminary Report on Patentability corresponding to International Patent Application No. PCT/EP2011/004027 dated Apr. 25, 2013.

* cited by examiner

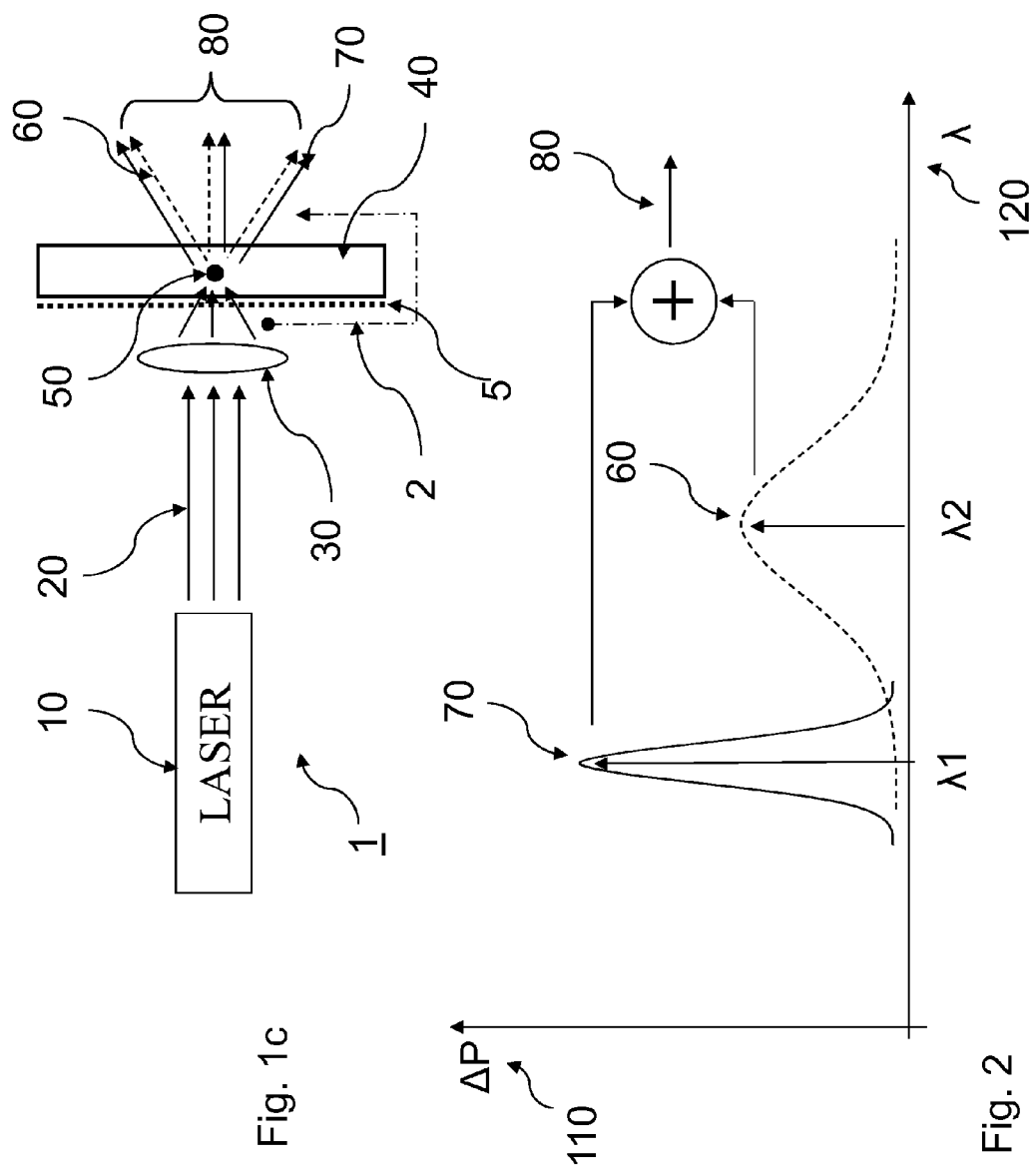

LASER-BASED WHITE LIGHT SOURCE

The invention generally relates to the generation of white light. More particularly, the invention relates to the generation of whitish light having a low etendue or light guidance factor, from laser light sources by spectral range conversion.

Numerous applications require a white light source as a central illumination element. Such light sources are required especially in medical diagnostics, in non-contact measurement methods, white light interferometry, optical coherence tomography, in distance measurement, but also as a broadband light source in fundamental research.

Also, high-performance white light sources could be useful in the automotive field, or for example in building lighting. Additionally, the field of video projection should be mentioned. Especially here a strong demand is expected, since as a result of the introduction of high-resolution video systems and apparatus for three-dimensional imaging, the demand for compact, efficient and powerful white light sources will continue to increase. Moreover, by additionally using optical fibers or optical fiber bundles, highly flexible and innovative lighting concepts for a variety of the above application fields are feasible.

For generating white light, in particular thermal light sources are known. Although these light sources permit to produce very high luminous flux, these light sources have various drawbacks.

For example, only a small part of the so generated radiation is in the visible spectral range. The major part is emitted as heat radiation. This unwanted waste heat has to be dissipated for most applications, which is complex and expensive. Also, if these light sources are subjected to frequent switching operations, their operating life is considerably reduced. Moreover, these lights are expensive and bulky and, due to their low efficiency, consume a lot of energy.

An alternative is to use LEDs or other semiconductor light sources. Although they cannot emit white light directly, the use of so-called conversion or luminescent layers presents a way out. Such conversion layers or substances have been known for many decades, and correspondingly high is their availability and level of development. In such conversion layers, the irradiated light is converted into radiation of longer wavelength. In this way, when using suitable semiconductor light sources, comparatively powerful white light sources can be produced by irradiating and mixing different conversion materials, for example red, green, and blue.

U.S. 2009/0,262,308 A1 describes a device of this kind for generating white light using conversion layers. The field of application is in the area of video projection. Here, light from a light source that emits in the blue spectral range is converted through a conversion layer into the green spectral range. Together with another light source also emitting in the green, and with a blue and red light source, the white light required for video projection is produced by mixing the colors. The respective individual light sources are directed onto a light smoothing unit by means of a condenser. A disadvantage here is that due to diffusion in the conversion medium the etendue increases.

U.S. 2009/0,284,148 A1 describes another device for generating white light using conversion layers. Again, the field of application is in the area of video projection. Here, by using a light source which emits in the blue spectral range, light is irradiated onto a segmented disc. On this disc, there are at least two conversion layers. One converts to the red spectral range, the other to the green spectral range. The blue light does not need to be converted, only a diffusion layer is used. By rotating the disc, red, green, and blue conversion or diffused light is generated in quick succession. A disadvantage here is that white light is produced at no time but only by the time averaging in the eye of the spectator due to the persistence of vision. Moreover, the blue light is diffused for being matched to the emission characteristics of the red and green lights. That means that the etendue of the light source is increased.

U.S. Pat. No. 7,442,356 B2 also describes a device for generating converted light. Here, light is supplied from a semiconductor-based light source (laser or LED) to a conversion medium, through a fiber. A disadvantage here is that the light emerging from the fiber is approximately parallel. Thus, due to the diffusion in the conversion medium the etendue is significantly increased.

Although relatively large light flux can be produced in this way with reasonable efficiency, the etendue of such light sources, also referred to as light guidance factor, is unacceptably high for most applications. However, besides light flux and efficiency, this value represents another fundamental quality criterion of light sources. Since the formula for calculating the etendue only includes the surface of the luminous area and the numerical aperture, i.e. the angular distribution of the radiation, this value is a constant for a light source with given emission characteristic. At best, this value may be maintained by subsequent optical systems.

An optical system, hereinafter, refers to any system that influences light in its direction of propagation, such as for example, lenses, mirrors, diffractive elements, light guides, etc. In other words, the optical system may at best forward its own etendue. The change of the etendue in an optical system in the optical path is therefore a measure for the ability to orderly transfer light from one point to another. Generally, however, optical systems are imperfect and increase the etendue.

If the etendue of the optical system is smaller than that of the light source, light energy is lost. This implies adverse consequences for a detector which may also be an imaging surface, for example a screen, or to a fiber or fiber bundle, since that is why the entire available light energy can no longer be fed into the detector or the fiber or fiber bundle. Especially for feeding into a fiber or a fiber bundle, the smallest possible etendue has to be achieved. The smaller this value is, the simpler optical systems can be configured without adversely affecting their efficiency in terms of light transmission.

However, diffusion in the conversion medium increases the etendue since the cone angle of the converted light is substantially greater than that of the irradiated light, thereby deteriorating the beam quality. Due to this increased etendue, a reproduction of the converted light onto small surfaces or into small angles or into a most favorable combination of both is no longer feasible or only to a limited extent. Therefore, the etendue of the light source should be the smallest possible in order to enable a large portion of the radiation to be transferred from the source to the detector without suffering great losses.

An object of the invention therefore is to provide a white light source having a small etendue and at the same time a high luminous flux of whitish light. This object is achieved by the subject matter of the independent claim. Advantageous embodiments are set forth in the respective dependent claims.

Accordingly, the invention provides a device for generating white light, comprising at least one monochromatic light source and at least one conversion medium, wherein the at least one light source emits in the blue and/or ultraviolet spectral range, and wherein the light from the at least one monochromatic light source is generated by a laser, and the light of the at least one monochromatic light source is focused by an optical system onto the conversion medium, and the conversion medium converts at least part of the incident monochromatic light into a different spectral range. Focusing herein means that the focus of the light is in the conversion medium. Since the diffusion in the conversion medium and the conversion itself result in a non-directional radiation and thus in an increase of the angular distribution, focusing may be used advantageously. If the radiation is focused prior to conversion, the angular distribution will not be degraded further in the ideal case, since it is independent of the angular distribution of the incident radiation in a first approximation. But the illuminated area and hence the etendue has become smaller by focusing. In other words, the etendue is the product of the distribution in the spatial and angular domains. However, conversion mainly affects the angular domain, since the conversion medium typically emits isotropically or at least in a large solid angle. Thus, by focusing the major part of the disorder prior to conversion is transferred into the angular domain. In this way, the adverse effects can be minimized.

Using an optics downstream the conversion medium then permits the opening angle of the converted light emanating from the focus to be reduced again. In this way, according to one embodiment of the invention, the opening angle can be adapted to the numerical aperture of a light guide which forwards the converted light.

Herein, the blue and/or ultraviolet spectral range of the radiation emitted by the monochromatic light source is understood as a range with a gravity center preferably below 500 nm, more preferably below 480 nm, and most preferably below 470 nm.

Conversion media that come into consideration include in particular phosphors and substances converting through fluorescence. In particular, various fluorescent substances may be combined. Suitably, at least as mixture constituents, are for example those fluorescent substances which are also employed for generating white light from blue light in white light LEDs.

In a particularly preferred embodiment, the monochromatic light source is formed by at least one semiconductor laser or one laser diode, since this enables to produce very high power densities and to provide more light in smaller fiber bundles.

In order to homogenize the intensity distribution of the laser over the cross section or beam profile thereof, it is particularly advantageous if a beam shaping element is provided in the optical path upstream the conversion medium, which alters the intensity distribution of the light beam from the at least one monochromatic light source. Suitable optical elements include beam shapers and diffractive optical elements. Suitably, the optical element is arranged upstream of the conversion medium, or in the optical path between the light source and the conversion medium. Altering the intensity profile allows for an adjustment to downstream optical elements. For example, the intensity profile may be adjusted such that when feeding into a fiber bundle, each fiber receives the same light energy.

In a particularly preferred embodiment, the optical system is formed by refractive elements such as lenses, reflective elements such as mirrors, diffractive elements such as Fresnel lenses, or holographic optical elements (HOE), or a combination thereof.

When the optical system has a numerical aperture of preferably greater than 0.3, or more preferably greater than 0.45, or even more preferably greater than 0.6, the light is focused onto a correspondingly small focal spot. Most preferred is a numerical aperture of greater than 0.8. Accordingly, the light is focused by the optics or the optical system onto the conversion medium preferably with a large opening angle. Preferably, the optics is configured such that the opening angle of the light impinging on the conversion medium is at least 35°, more preferably at least 55°, most preferably at least 70°. With a numerical aperture of 0.8, the opening angle is greater than 106°. Since the light is then distributed over a correspondingly wide angular range already prior to conversion, the beam quality is not so strongly affected by the conversion and diffusion as in case of illumination with a lower numerical aperture or even with collimated light.

In a particularly preferred embodiment, the converted light is within the yellow spectral region, with a center of gravity in a range from 550 nm to 620 nm, with a half width of preferably greater than 50 nm, more preferably greater than 100 nm, and most preferably greater than 150 nm, so that by mixing with the blue, directly transmitted light from the monochromatic light source, whitish light is produced.

In a particularly advantageous embodiment, the conversion medium is mounted for rotation, for example along its longitudinal axis, but other possibilities are also conceivable, for example oscillating mounting. In this way, a degradation of the phosphor as the conversion medium due to the strong focusing may be avoided or significantly delayed, since the power and resulting heat are distributed over a larger area.

Usually, the number of non-radiative transitions increases with rising temperature. The movement reduces the power density in the phosphor. Since the phosphor substances are usually embedded in matrices of poor thermal conductivity (e.g. silicones, epoxies, or glasses), this is an important measure to allow for cooling.

Therefore, according to an advantageous modification of the invention, a means is provided for moving the conversion medium relative to the light beam from the light source.

Another advantageous way to accomplish cooling is to use highly thermally conductive materials. To this end, it is possible for the conversion medium, such as in particular one or more phosphors, to be embedded in optical ceramics. Preferred optical ceramics include those exhibiting a thermal conductivity of at least 5 W/mK, for example an optoceramic with a thermal conductivity of about 10 W/mK. For comparison, organic substrates exhibit thermal conductivities of typically less than 1 W/mK. Glasses typically have thermal conductivities of about 1 W/mK. When using a highly heat conductive substrate material such as preferably the optoceramic, even a non-moving conversion element can be cooled sufficiently. It will be appreciated, however, that highly heat conductive substrates or matrices of the conversion element may likewise be moved by suitable means to further reduce the heat load or to generally prevent degradation.

In a particularly preferred embodiment, the conversion medium is replaceable. Thus, a defective conversion medium may be replaced by a functioning conversion medium, or by a conversion medium which converts into a different spectral range.

Furthermore, advantageously, the conversion medium is configured to be mirrored on the side facing the laser for wavelengths which the conversion material emits when excited by laser light, that is larger wavelengths than those of the laser light, in order not to adversely affect the light mixing, and to increase efficiency. Thus, it can be achieved that the converted light which is also emitted in the reverse direction is not lost. By such mirroring it is again reflected in forward direction and so is again available for illumination.

Particularly advantageously, the conversion plate is configured to be self-cooling. This may be accomplished, for example, through an impeller on the rotational axis of the phosphor support (radial fan). In this way an air flow is produced by the rotation, which dissipates the heat to the surroundings. However, other variations are likewise possible.

In an especially preferred embodiment, the means for white light generation is adapted for feeding into an optical light guide, in particular a fiber and/or a fiber bundle, or the light guide is part of the means for generating white light. In this way, the available light power may be divided to a plurality of secondary light sources.

In another particularly preferred embodiment, the means for generating white light is adapted to produce different colors by color or color temperature changes.

The color change may be produced particularly advantageously by focusing to different tracks on the conversion medium.

These may be located at different axial distances of the conversion plate, for example. However, other configurations are likewise conceivable, such as stripes of an oscillating conversion medium.

In another embodiment, the color change may be achieved by superpositioning light from an LED which emits in the ultraviolet and/or red spectral range.

Especially advantageously, this superposition may be created dichroitically or by mixing.

The invention will now be explained by way of exemplary embodiments and with reference to the accompanying drawings, wherein the same reference numerals refer to the same or similar elements. In the drawings:

FIG. 1c shows a modification of the white light source of FIG. 1b;

Figure 3:
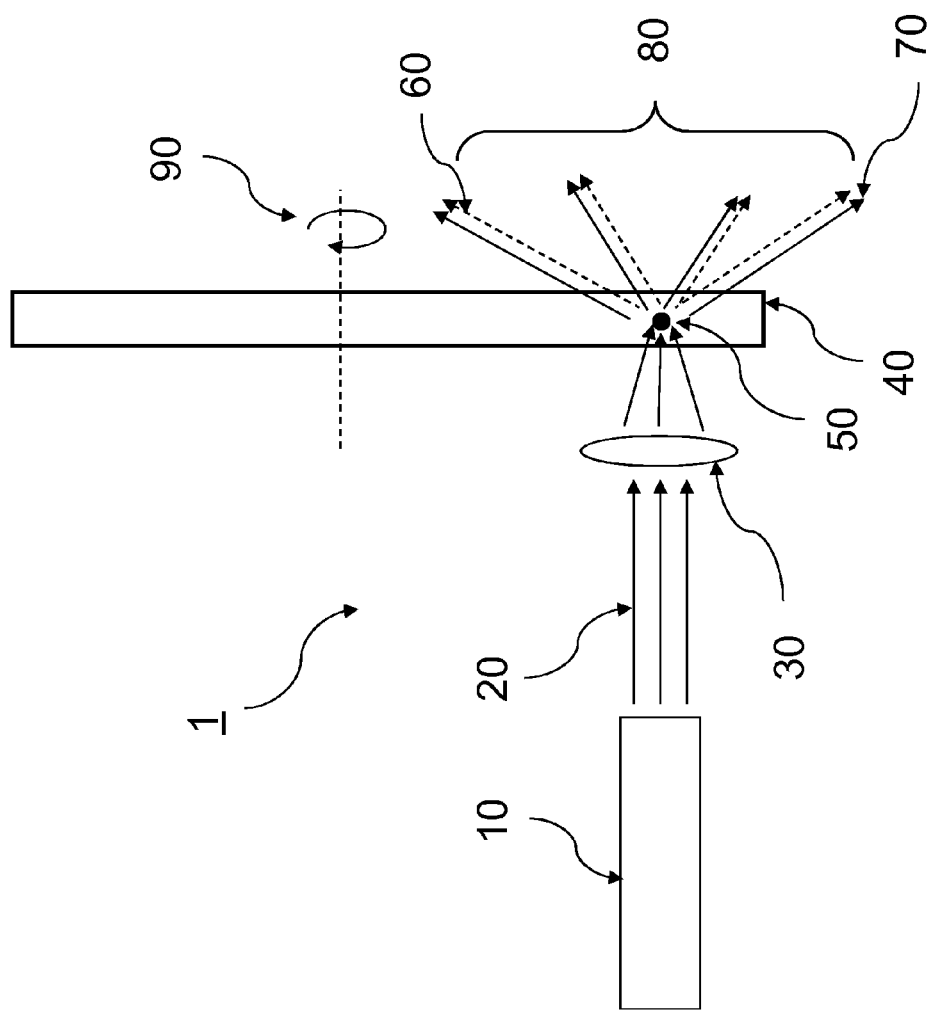
Figure 4:
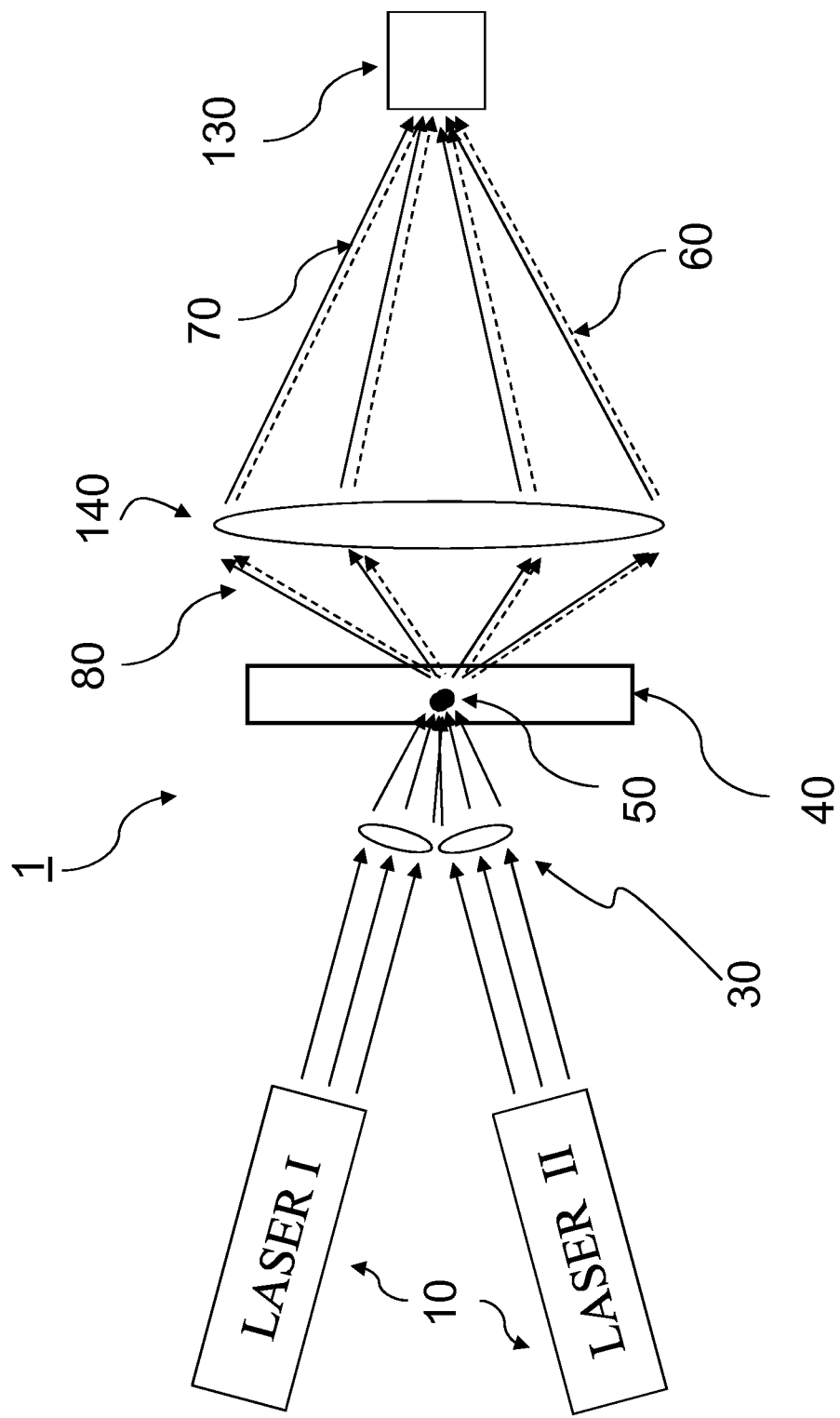
Figure 5:
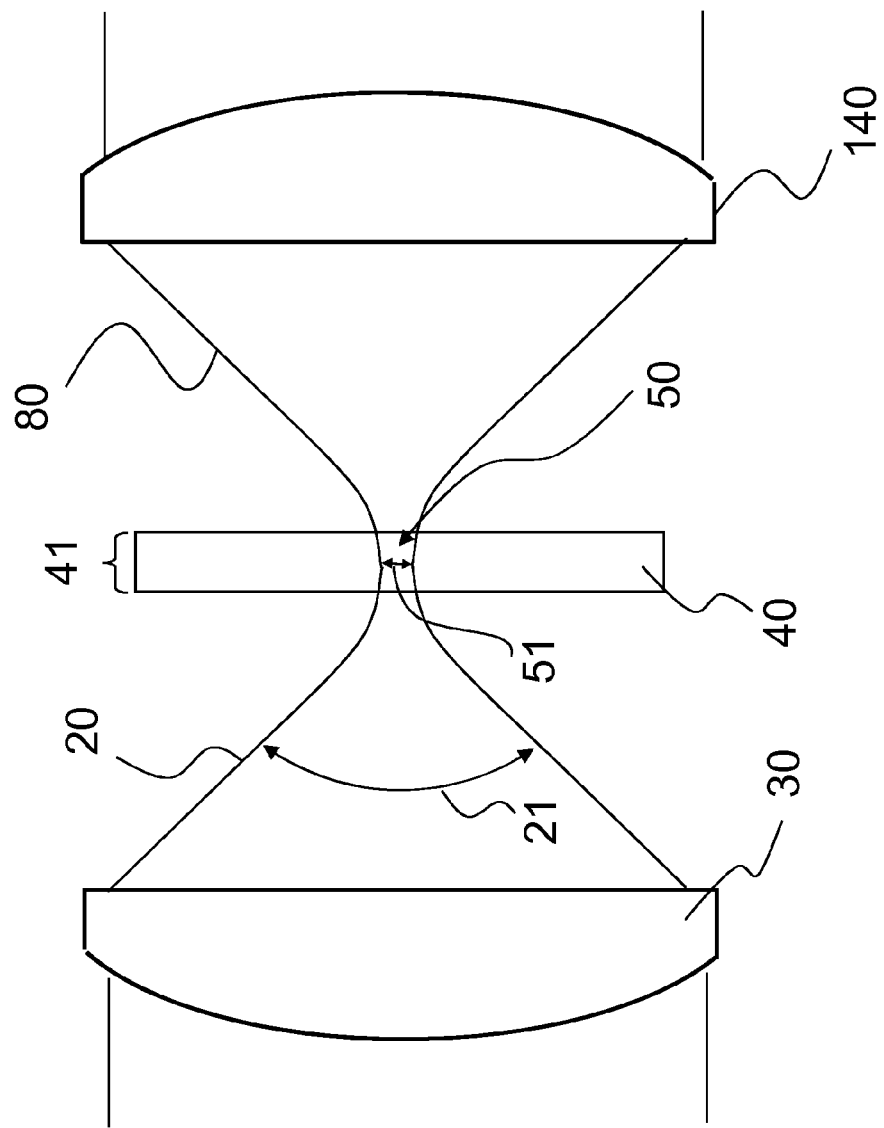
Figure 6:
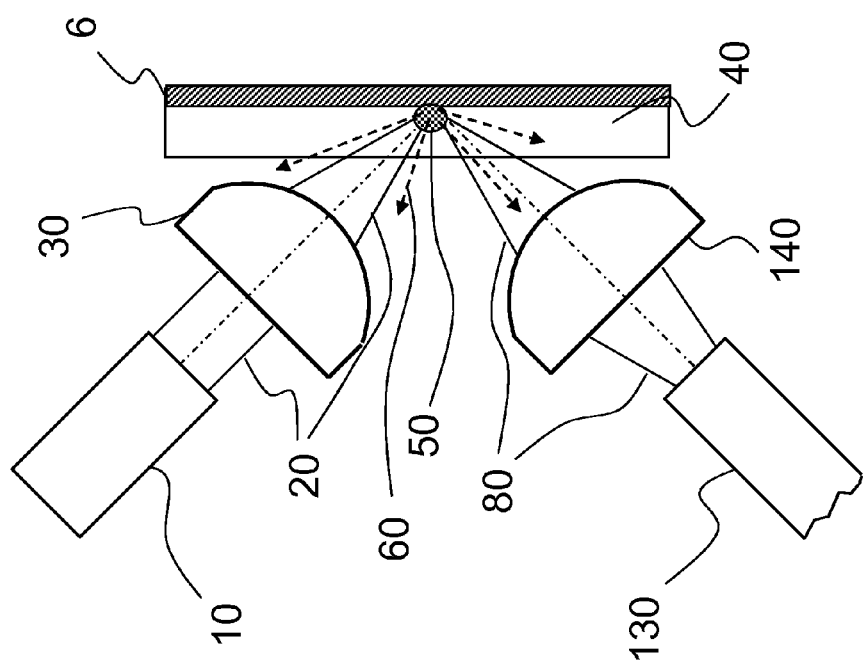
Figure 7:
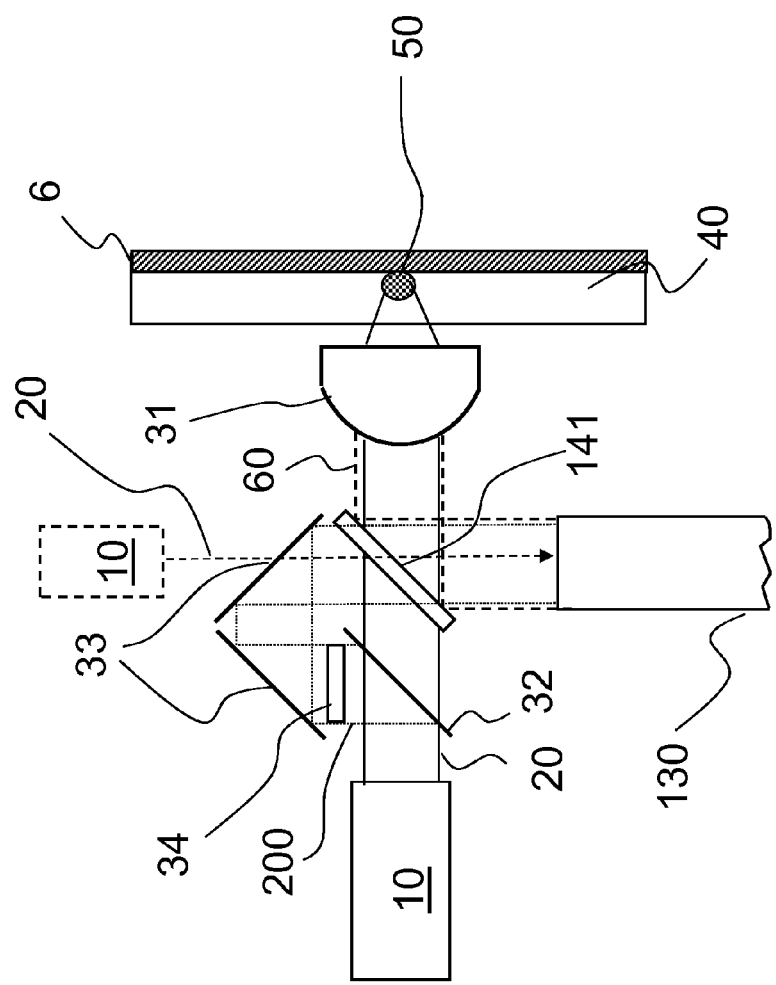

FIG. 2 schematically illustrates how white light is produced through mixture of the directly transmitted blue radiation and the converted yellowish radiation;

FIG. 3 shows an exemplary embodiment of the white light source according to the invention with rotating conversion material;

FIG. 4 shows another exemplary embodiment of the laser-based white light source according to the invention for feeding into a fiber bundle;

FIG. 5 illustrates details of a laser-based white light source;

FIG. 6 shows another embodiment of the invention, in which the converted light is reflected in the conversion medium back to the side of the incident laser beam;

FIG. 7 illustrates a variation of the embodiment shown in FIG. 6.

Figure 1A:
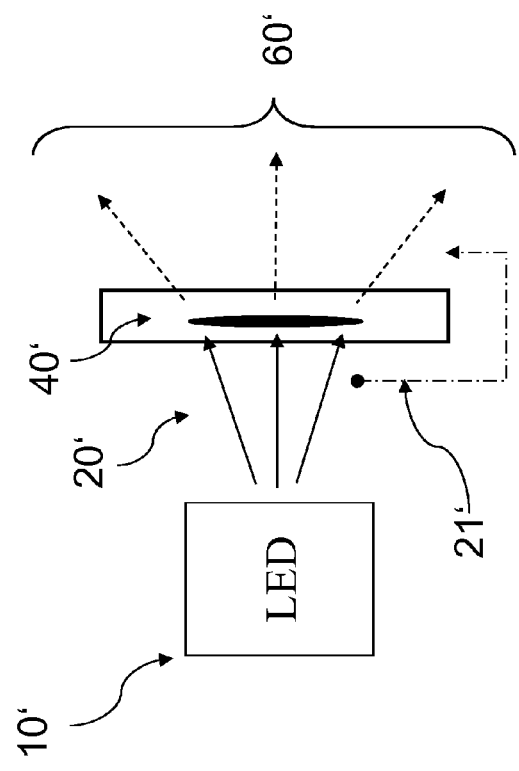
FIG. 1a is a general view of a prior art white light source.

FIG. 1a shows an overall view of a white light source according to the prior art. Here, an LED light source 10' irradiates monochromatic light 20' to a conversion medium 40'. Through scattering, the monochromatic light is converted into a bundle 60' of light rays of a different wavelength 21'. Due to the scattering, the etendue of the light source 10' is increased further (in FIG. 1a identified by a large area and an increasing numerical aperture). It is immediately apparent that a subsequent optical system would have to meet high quality requirements to catch and pass all the light of this light source without sacrificing beam quality. When the etendue has become too large, even a good optical system will not help to feed the light into a fiber bundle with a smaller etendue at low loss.

Figure 1B:
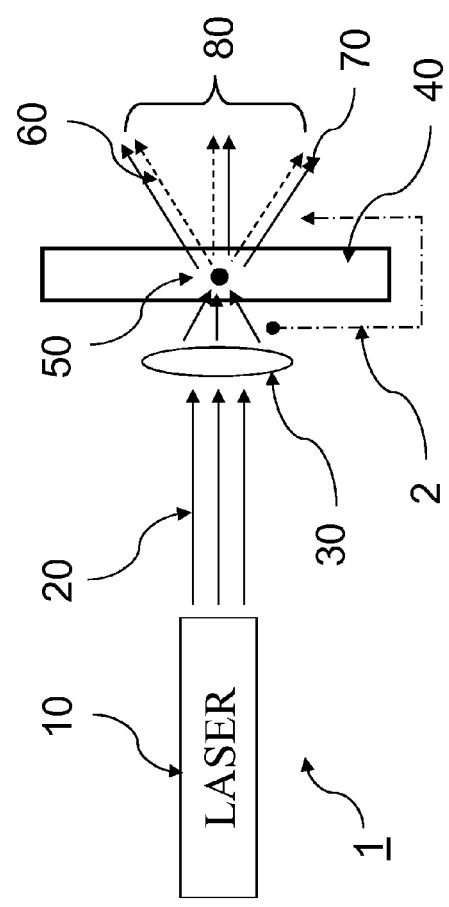
FIG. 1b is a general view of the white light source according to the invention.

FIG. 1b illustrates the white light source 1 according to the invention. Here, monochromatic blue light 20 from laser light source 10 is focused via an optics or optical system 30 onto a conversion medium 40 into a focus 50 and is converted into a light beam 60 of yellowish light. Together with the proportionately directly transmitted blue radiation 70, white light 80 with low etendue is produced (in FIG. 1b the converted radiation 60 is illustrated in broken lines being superimposed). When compared to FIG. 1b it can be seen that feeding into a fiber, a fiber bundle or generally an optical system is significantly simplified.

FIG. 1c shows a variation or modification of the embodiment illustrated in FIG. 1b. In this example shown in FIG. 1c, the conversion medium 40 is mirrored for wavelengths greater than the lasing wavelength on the surface facing the laser 10. To this end, a dielectric reflection layer 5 is applied to this surface of conversion medium 40, which transmits the light from laser 10 but reflects the converted light of the longer wavelength. Thus, the converted light which is emitted towards laser 10 is reflected back so that it emerges from the side of the conversion medium opposite dielectric layer 5.

FIG. 2 schematically shows how whitish light may be produced by mixing colors. For this purpose, a power 110 vs. wavelength 120 graph is illustrated. The directly transmitted part of monochromatic blue laser radiation 70 mixes with the part that has been converted into the yellow spectral range 60 by conversion medium 40, in FIG. 2 again illustrated as a broken line, to result in whitish light 80. Suitable fluorescent substances for producing yellow light from blue laser radiation for being mixed into whitish light include those used in white light LEDs. One example of such fluorescent substances is cerium-doped yttrium aluminum garnet.

FIG. 3 illustrates one embodiment of the white light source 1 according to the present invention. The operation thereof is essentially the same as in FIG. 1b, except that here the conversion medium 40 is mounted for rotation about an axis 90, and is rotated by a means for moving the conversion medium. This reduces or eliminates the thermal problems due to the focusing and the high light intensity in the focus. At the same time, the speckle of the blue light is reduced. The converted yellowish radiation 60, however, has no speckle, so that speckle-free white light is produced.

FIG. 4 illustrates another exemplary embodiment of the white light source 1 according to the invention. Here, the produced whitish light 80 is fed into a fiber bundle 130 by means of an optical system 140. In contrast to FIG. 1b and FIG. 3, two monochromatic laser light sources 10 are used here, to further increase luminance. The other embodiments of the invention described above preferably also comprise an optical system 140 for collimating the light emerging from conversion medium 40. Therefore, generally, without being limited to the particular embodiments of the invention illustrated in the figures, one embodiment of the invention comprises an optics or optical system 140 which collimates the converted light. Collimation, in the context of the invention, more generally refers to a reduction of the opening angle of the light exiting from conversion medium 40. Accordingly, optical system 140 represents an optics arranged downstream the conversion medium in the direction of light propagation, which reduces the opening angle of the converted light emanating from the focus. Preferably, this optical system directed the collimated light to a light guide, such as in particular the fiber end of an optical fiber or an optical fiber bundle.

The conversion medium 40 is preferably formed as a thin layer or sheet, as is also illustrated in the previous figures. In particular, for the purpose of the invention to increase the etendue the least possible, it is generally favorable to select the thickness of the conversion medium 40 in the same order of magnitude as the dimension of the focus generated by the optical system 30. Generally, without being limited to the embodiments of the present invention illustrated in the figures, in one embodiment of the invention the conversion medium has a thickness of less than 0.3 millimeters, preferably of about 0.2 millimeters.

Particularly preferable, the thickness of the conversion medium and the optical system 30 are adapted such that the thickness of the conversion medium as measured perpendicular to the surface thereof is larger by at most a factor of 3 relative to the transverse dimension of the focus. In case of a circular focus 50, the transverse dimension is the diameter of the focus. Low layer thicknesses of the conversion medium 40 are advantageous to convert as few as possible of the incident blue and/or ultraviolet light from the laser outside the area of the actual focus 50. This would result in a spatial increase of the area within which converted light is produced.

For exemplary purposes, FIG. 5 illustrates the focus 50 in the conversion medium. In this example, focus 50 of blue light 20 which is generated by optical system 30 has a diameter 51 which is approximately half as large as the thickness 41 of conversion medium 40, as measured perpendicular to the surface thereof, i.e., in this example, measured in the direction of light incidence. The transverse dimension, or more specifically the diameter of focus 50 in case of a radially symmetrical beam, is understood as the dimension of the beam cross-section, within which the intensity falls to half the maximum value. In other words, the transverse dimension of the focus is understood as the half-width thereof. When using more than one laser focused to a point within the conversion medium 40, the half-width accordingly results from the intensity distribution of the superimposed intensities of the individual lasers.

In another embodiment of the invention as described above, a large opening angle 21 of the incident monochromatic blue light 20 is intended in order to obtain a small diameter 51 of the focus 50. Accordingly, an optical system 30 is used which has a high numerical aperture. Preferably, the numerical aperture is at least 0.6, which corresponds to an opening angle of more than 73° when the incident blue laser beam is a parallel beam. In the example shown in FIG. 5, the opening angle 21 provided by optical system 30 is even greater than 90°. Particularly preferred is a numerical aperture of greater than 0.8, which corresponds to an opening angle of more than 106°.

In the embodiments described above, the laser light is irradiated on one side of the conversion medium, and laser light exiting from the opposite side and converted light is caught by an optical system 140.

However, it is also possible for the device to be configured as a reflective arrangement. For this purpose, without any limitation to the exemplary embodiments, in one modification of the invention the optical system 30 and the optics 140 downstream of the conversion medium 40 in the direction of light propagation are arranged on the same side with respect to the conversion medium 40. On the opposite side of the conversion medium 40 a reflecting means is arranged, which reflects the light from light source 10 and the light converted in conversion medium 40 back through the conversion medium 40. The light reflected back and emerging from conversion medium 40 is then captured by optics 140 and fed into an optical light guide, for example. One example of such a device 1 for generating white light is shown in FIG. 6.

In the embodiment shown in FIG. 6, the blue laser light or blue monochromatic light 20 from laser light source 10 is irradiated and focused onto the surface of conversion medium 40 in an oblique angle, so that the focus 50 is located in the conversion medium 40, as in the embodiments described above. On the surface of conversion medium 40 opposite to the side onto which the blue laser light 20 is irradiated, a reflection layer 6 is disposed as the reflecting means. For this purpose, for example, a metallic reflection layer or a broadband reflective dielectric coating may be provided on this surface of the conversion medium. The directly transmitted laser light 70 and the converted light 60 produced in the conversion medium 40 and emitted towards the reflection layer are reflected at reflection layer 6, so that the white light 80 resulting from the mixture of these radiations leaves the conversion medium 40 to the same side onto which the blue laser radiation 20 is irradiated. Naturally, the converted light 60 is emitted into the entire half-space adjacent to the laser side surface of the conversion medium.

Therefore, the optics 140 downstream of the conversion medium 40 in the direction of light propagation or light incidence is arranged on the same side of conversion medium 40 as the optical system 30. Similar to the example shown in FIG. 4, optics 140 reduces the opening angle of the white light 80, so as to adjust it to the numerical aperture of a light guide such as an optical fiber bundle 130 for feeding into the latter. In the illustrated example, optics 140 as well as optical system 30 are arranged obliquely relative to the surface of conversion medium 40.

A reflective arrangement as shown in the example of FIG. 6 allows the conversion medium 40 to be connected to a cooling device at its rear side, so as to achieve better cooling.

A transmissive system as shown in FIGS. 1b, 1c, 3, and 4 is simpler in terms of, by properly adjusting transmission, transmitting unconverted the intended proportion of blue light to generate white light. This fine-tuning, however, may possibly be difficult, so that a reflective system might be easier to master, despite its seemingly more complex configuration at first.

FIG. 7 shows a variation of the exemplary embodiment illustrated in FIG. 6. In this variation a lens 31 is provided which forms both the optical system 30 as well as the optical system 140, or at least a part of these optical systems. Generally, without being limited to the specific exemplary embodiment illustrated, according to one embodiment of the invention, optical system 30 and optics 140 downstream the conversion medium 40 in the direction of light propagation are arranged on the same side with respect to the conversion medium 40, and a reflecting means is arranged on the opposite side of the conversion medium, which reflects the light from light source 10 and the light converted in the conversion medium back through the conversion medium 40, wherein the optical system 30 and the optics 140 downstream of the conversion medium 40 in the direction of light propagation from laser 10 have a common focusing optical element, preferably a lens 31, which has its optical axis oriented preferably perpendicular to the surface of the conversion medium 40 facing the lens 31. Instead of a lens 31 a concave mirror could be used, for example.

Here, the optical axis of lens 31, which is also that of optical systems 30, 140, extends perpendicular to the surface of conversion medium 40. This allows to use a lens 31 with a short focal length and a correspondingly high numerical aperture of optical systems 30, 140. Similar to the embodiment illustrated in FIG. 6, the converted light 60 produced in focus 50 by the lens 31, is partially emitted towards lens 31, partially reflected at reflection layer 6 and so directed towards lens 31. Lens 31 then produces, from the converted light, a light beam of converted light propagating anti-parallel to the incident laser light 20. This light beam is deflected by a dichroic mirror 141 as a component of optical system 140, so that it may be fed into a light guide, for example again an optical fiber bundle 130. Dichroic mirror 141 is configured to reflect the converted radiation, but to transmit the laser light 20.

For producing white light, now there are various possibilities. One possibility is to select the conversion medium 40 such that the converted light is white. This is particularly simple when a laser 10 is used which emits ultraviolet radiation, so that, in the conversion medium, blue light is generated as part of the converted radiation 60 and is reflected at dichroic mirror 141. In this case, mirror 141 is configured to transmit the ultraviolet laser light 20 and to reflect blue light.

Another possibility is to employ another laser or a blue light source, for example a blue emitting diode, and to separately feed the light therefrom into the light guide to obtain a blue component in the white light. An appropriately arranged further laser 10 and its light beam 20 are indicated in FIG. 7 in broken lines. An advantage of this possibility is, that the color or color temperature of the white light may easily be altered by adjusting the intensity of the additional light source and hence of the blue component.

Yet another possibility is to use a beam splitter 32, which deflects a portion of the laser light 20 and thereby generates a partial beam 200. This part of the laser light may then be deflected by mirrors 33 or a suitable prism into a direction collinear to the converted light 60 reflected at dichroic mirror 141, and may thus be fed into the light guide. Here, again, the color or color temperature may be changed by altering the intensity of the collinear partial beam from laser 10. This may be accomplished, for example, by adjusting mirrors 33 or the beam splitter so that an adjustable proportion of split-out laser beam intensity is routed past light guide 130. Similarly, an adjustable optical attenuating element, such as a gray wedge or a polarizer 34 adjustable relative to the polarization direction of laser 10 may be arranged in the optical path of partial beam 200.

It will be apparent to those skilled in the art that the invention is not limited to the exemplary embodiments described above, but may be varied in many ways. In particular, the invention may also be applied in other lighting, light guiding, or imaging applications than those referred to in the introductory part.

LIST OF REFERENCE NUMERALS 1 white light source
5 dielectric reflection layer
6 reflection layer
10 laser light source
10' LED light source
20 monochromatic blue light
21 opening angle
20' monochromatic light
21' conversion step
30, 140 optical system
31 lens
32 beam splitter
33 mirror
34 polarizer
40 conversion medium
41 thickness of 40
50 focus
51 diameter of 50
60 converted radiation
60' beam of a different wavelength
70 directly transmitted blue radiation
80 white light
130 fiber bundle
141 dichroic mirror
200 partial beam of 20

The invention claimed is:

1. A device for generating white light, comprising:
at least one laser that emits a parallel light bundle in the blue and/or ultraviolet spectral range;
at least one conversion medium that emits converted light at an opening angle;
an optical system including a single member that focuses the parallel light bundle onto the at least one conversion medium such that the focus of the parallel light bundle is in the conversion medium and such that the conversion medium converts at least part of the light into a different spectral range, the optical system having a numeric aperture that is greater than 0.3 so as to focus the parallel light bundle onto a correspondingly small focal spot of the conversion medium; and
optics downstream of the at least one conversion medium in a direction of light propagation towards a light-utilizing device, the optics being configured to reduce the opening angle of the light converted by the at least one conversion medium,
wherein the optical system and the optics comprise a common focusing optical element arranged on a first side of the conversion medium together with a reflecting device that directs a portion of the parallel light bundle to the light-utilizing device through a dichroic mirror, whereas another portion of the parallel light bundle is directed to the conversion medium through the common focusing optical element and back to the dichroic mirror and directed to the light-utilizing device.

2. The device as claimed in claim 1, wherein the at least one laser comprises at least one semiconductor laser.

3. The device as claimed in claim 1, further comprising a beam shaping element arranged in an optical path upstream the at least one conversion medium, the beam shaping element being configured to alter an intensity distribution of the parallel light bundle from the at least one laser.

4. The device as claimed in claim 1, wherein the optical system comprises an optical element selected from the group consisting of a refractive optical element, a reflective optical element, a diffractive optical element, and combinations thereof.

5. The device as claimed in claim 1, wherein the single member of the optical system has a numerical aperture that is greater than 0.45.

6. The device as claimed in claim 1, wherein the single member of the optical system has a numerical aperture that is greater than 0.6.

7. The device as claimed in claim 1, wherein the single member of the optical system has a numerical aperture that is greater than 0.8.

8. The device as claimed in claim 1, wherein the optical system and the optics are arranged on a first side of the at least one conversion medium, and wherein the device further comprises a reflecting device arranged on a second, opposite side of the conversion medium, the reflecting device being configured to reflect light impinging on the reflecting device and the light converted by the at least one conversion medium back through the at least one conversion medium so that part of the light converted by the at least one conversion medium is collected by the optics and transmitted with a reduced opening angle to the light-utilizing device.

9. The device as claimed in claim 1, wherein the common focusing optical element comprises a lens having an optical axis oriented perpendicular to the first side of the at least one conversion medium facing the lens.

10. The device as claimed in claim 1, wherein the different spectral range is within a yellow spectral region with a point of concentration in a range from 550 nm to 620 nm, with a width of half maximum intensity greater than 50 nm.

11. The device as claimed in claim 10, wherein the width of half maximum intensity is greater than 100 nm.

12. The device as claimed in claim 1, further comprising a device configured to move the at least one conversion medium relative to the light from the at least one laser.

13. The device as claimed in claim 1, wherein the at least one conversion medium is replaceable.

14. The device as claimed in claim 1, wherein the laser is configured to emit the parallel light bundle at a predetermined wavelength and the at least one conversion medium is mirrored on a side facing the at least one laser for wavelengths greater than the predetermined wavelength of the laser.

15. The device as claimed in claim 1, further comprising a self-cooling conversion plate.

16. The device as claimed in claim 1, further comprising a fiber or a bundle of fibers as a white light receiving device.

17. The device as claimed in claim 1, wherein the at least one conversion medium comprises a plurality of different conversion medium tracks, each track being configured to generate a different color change.

18. The device as claimed in claim 1, wherein the at least one conversion medium is a plate-like configuration having outer surfaces and a thickness therebetween that is larger by at most a factor of 3 relative to the focal spot of the parallel light bundle impinging onto the conversion medium.

* * * * *